United States Patent Office 3,621,525
Patented Nov. 23, 1971

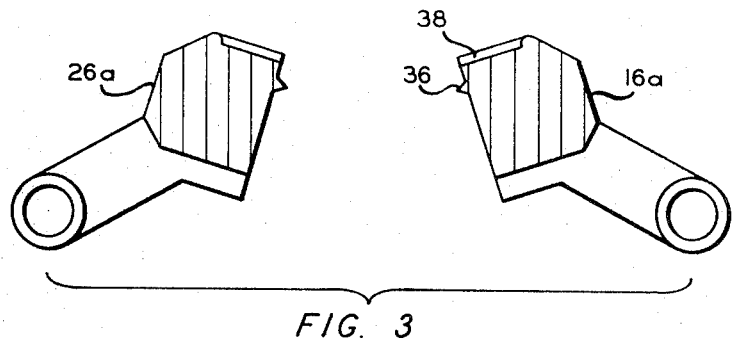
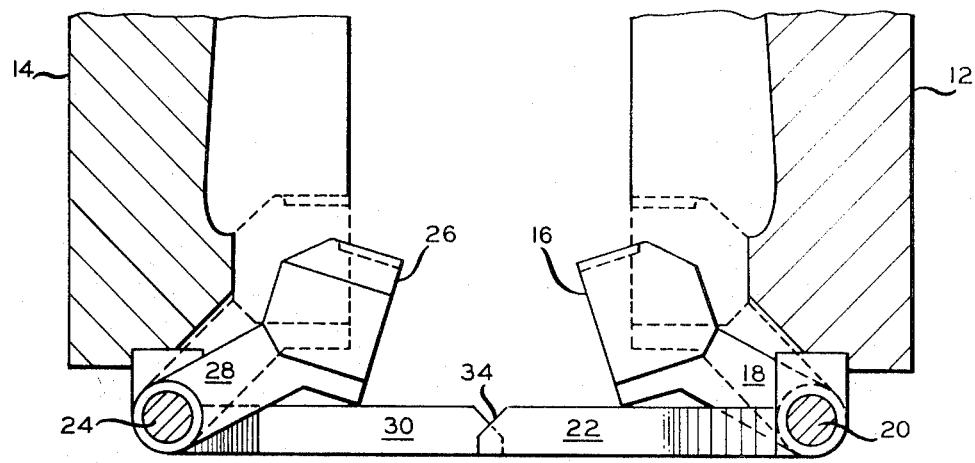
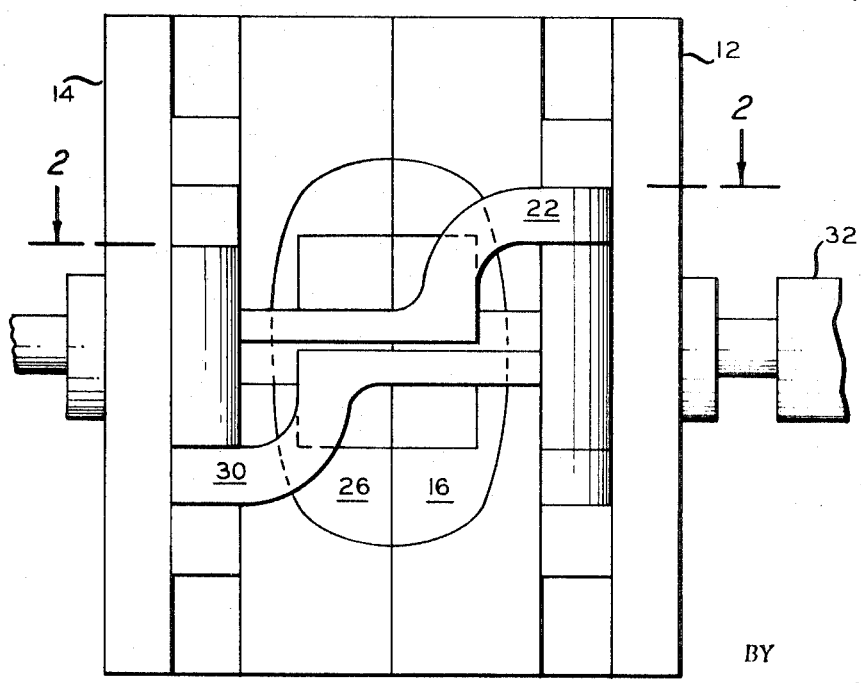

3,621,525
PIVOTAL BOTTOM INSERTS FOR BLOW MOLDING MOLD
Alvin E. Butcher, Bartlesville, Okla., assignor to Phillips Petroleum Company
Filed Aug. 18, 1969, Ser. No. 850,796
Int. Cl. B29d 23/03; B28b 7/10; B29c 7/00
U.S. Cl. 18—5 BR
7 Claims

ABSTRACT OF THE DISCLOSURE

In a mold for forming articles by blow molding, pivotal inserts are provided in the bottom forming portion of the mold. Preferably, these inserts pivot downward as the mold opens so that bottles with recessed bottoms can be removed without damage.

BACKGROUND OF THE INVENTION

This invention relates to mold means for blow molding hollow articles. In a more specific aspect, it relates to pivotal inserts in a mold adapted to seal an open end parison at orientation temperature.

The blow molding art goes back over 100 years, although it has only been in the last twelve years or so that it has achieved significant commercial success. With this commercial success has come more sophisticated blow molding techniques. These modern techniques allow molding hollow articles having unique shapes.

Recently, a new technique has been developed whereby parison preforms are heated to orientation temperature, stretched longitudinally, and introduced into a mold cavity where they are expanded out into conformity with the walls of the mold cavity while still at orientation temperature so as to give a biaxially oriented hollow article having exceptional strength and high clarity. With this technique, it is apparent that the most economical method of forming the parison preforms would be to extrude a continuous tube and cut it into individual work pieces as opposed to injection molding a closed end preform. However, these individual work pieces are open at each end and thus in order to take advantage of this economical method of fabrication, it is necessary to seal one end of the preform. This presents certain difficulties since the temperature at which orientation is achieved is generally about 1–50° F. below the crystalline melting point of the polymer which is at temperature at which the polymer normally does not seal. One solution to this problem is to squeeze the polymer together in the seal area and sever the tail portion of the parison from the remainder of the parison so as to leave a slight tab instead of severing flush with the bottom wall of the container. This, however, necessitates the formation of an unusually deep recess in the bottom of the bottle in order to allow the bottle having this tab to sit level on a flat surface. Removing bottles with a deep bottom recess from a mold usually results in scuffing or slight deformation which can also result in "rocker" bottoms being formed if the deformation is severe enough. Such a bottle can cause trouble in a filling line, since one tipped bottle can disrupt the entire line, and can be easily tipped over after filling on a store shelf or at home, for example. While it is known to provide axially moving inserts actuated by air cylinders and the like, such techniques are not feasible in instances where a seal of an open end parison must be obtained in this area, and in addition, such techniques do not really lend themselves to the high volume-high speed operation inherent in blow molding operations.

SUMMARY OF THE INVENTION

It is an object of this invention to provide an improved blow molding mold;

It is a further object of this invention to provide improved techniques for forming bottles from open end parisons; and It is yet a further object of this invention to provide apparatus suitable for forming bottles with recessed bottoms which apparatus is adaptable to commercial use.

In accordance with this invention, pivotal inserts are provided in the bottom forming portion of a blow molding mold.

BRIEF DESCRIPTION OF THE DRAWINGS

In the drawings, forming a part hereof, wherein like reference characters denote like parts in the various views, FIG. 1 is a bottom view of a blow molding mold utilizing pivotal inserts; FIG. 2 is a sectional view through line 2—2 of FIG. 1; and FIG. 3 is a detailed view of a preferred embodiment of the pivotal inserts.

DESCRIPTION OF THE PREFERRED EMBODIMENTS

The molds having pivotal inserts in accordance with this invention can be used in the fabrication of any blow molded article. However, they are of particular utility in the formation of blow molded hollow articles such as bottles from open end tubular parison preforms which have been heated to orientation temperature. In this preferred embodiment, thermoplastic material such as polymers of at least one mono-1-olefin having 2–8 carbon atoms per molecule are extruded into a continuous tubular formation which is then immediately passed through a vacuum cooling and sizing chamber to cool the material to below the crystalline melting point thereof. This thus cooled extrudate is then cut into individual work pieces and reheated to orientation temperature which is generally 1–50° F., preferably 10–30° F., below the crystalline melting point thereof. For instance, for polypropylene, which is a preferred material, the preferred temperature is 310–330° F. The parison, while at this temperature, is then stretched longitudinally and thereafter stretched circumferentially by the introduction of internal fluid pressure to cause it to conform to the shape of the mold cavity.

Each of the inserts is mechanically closed as the mold halves close by the action of cam rods attached to the opposite mold half. It is preferred that the inserts pivot down to allow removal of the bottle by the action of gravity. Bottles can then be removed from the side or else the mold opened wide enough to allow the removal downwardly. In an alternative embodiment, the inserts can be pivoted about a shaft having frictional characteristics such that the inserts are held in the upward position until a later stage in the cycle where they are then mechanically lowered. In this connection, they can also be spring-biased upwardly. However, these latter techniques detract from a principal meritorious feature of this invention, the exceptional simplicity with which the difficult operation of sealing an open end parison at orientation temperature can be accomplished without distortion of the resulting bottle on its removal from the mold.

The mold and related parts can be formed of any construction material standard in the industry such as steel, aluminum, and the like.

Preferably, the inserts are so contoured as to seal the walls of the parison together and thereafter sever the part of the parison attached to what is to be a bottom wall of the resulting article from the tail portion. Preferably, the severing means are spaced downwardly from the bottom wall forming portion of the mold insert a distance of $1/100$ to $1/2$, preferably $1/32$ to $1/8$, inch.

The pivotal inserts of the instant invention can be adapted for use with any conventional blow molding apparatus and are of particular utility with apparatus such as is disclosed in Turner et al., U.S. 3,390,426, the disclosure of which is incorporated herein by reference. The pivotal inserts can be used in apparatus such as is shown in Turner et al. either with or without an internal tamping foot.

Referring now to the figures, particularly FIGS. 1 and 2, there is shown first and second blow molding mold halves 12 and 14, respectively. Attached to first mold half 12 is first insert 16 which is connected through arm 18 to first shaft 20. Arm 18 and hence insert 16 pivot about shaft 20. Fixedly attached to first mold half 12 is first cam rod 22. Second mold half 14 carries second shaft 24 about which second insert 26 carried by arm 28 pivots. Fixedly attached to second mold half 14 is second cam rod 30. Opposed mold halves 12 and 14 are caused to open and close by means of air cylinders 32. As the mold halves move together, surface 34 of first cam rod 22 contacts arm 28 and causes insert 26 to pivot into position, as shown by the broken lines in FIG. 2. Simultaneously, second cam rod 30 contacts arm 18 to pivot first insert 16 into position. FIG. 1 shows the position of these elements after the molds are completely closed. As the molds open and cam rods 22 and 30 move away from arms 28 and 18, respectively, inserts 16 and 26 pivot downwardly by the action of gravity until they contact cam rods 22 and 30, respectively.

FIG. 3 shows a pair of inserts 16a and 26a, each of which has an elongated cutting or severing means in the form of knife edge 36. While it cannot be seen from this drawing, since it is a sectional view, knife edge 36 extends the entire width of the insert. Cutting member 36 is disposed downwardly from bottom forming surface 38 of the inserts a distance of about $\frac{1}{16}$-inch.

Many conventional parts such as air lines, support members, cooling channels, control systems, and the like have been omitted for the sake of simplicity, but their inclusion is understood by those skilled in the art and is within the scope of the invention.

EXAMPLE

Propylene homopolymer having a density of 0.905 (ASTM D 1505–63T), and a melt flow of 3.5 (ASTM D 1238–62T, Condition L), and a crystalline melting point of 340° F. is extruded into tubing having an internal diameter of 0.8-inch and a wall thickness of about 0.125-inch. The tubing is cooled to room temperature and cut into 7-inch lengths. These 7-inch lengths are heated to a temperature of 320–327° F. The resulting heated parison is stretched longitudinally and placed between mold halves such as those shown in FIG. 2 having pivotal inserts with the configuration shown in FIG. 3. The mold halves are closed and in so doing, a cam rod attached to each mold causes the opposing pivotal insert to swing upward so that on final closing of the mold, the parison is pinched shut and severed. Internal fluid pressure is then introduced into the interior of the parison through the open neck end to expand said parison into conformity with the mold. The mold is then opened with the pivotal inserts swinging downward through the action of gravity to allow removal of the resulting bottle, having a recessed bottom area, without damage or scuffing. The resulting bottle has high strength and clarity imparted by the orientation. The bottom is sealed securely with a slight depending tab along the seal line. The depending tab is within said recessed portion of the bottom wall of the bottle so that the bottle sits level on a flat surface.

While this invention has been described in detail for the purpose of illustration, it is not to be construed as limited thereby, but is intended to cover all changes and modifications within the spirit and scope thereof.

I claim:

1. A blow molding mold comprising in combination: a first mold half; an opposed second mold half; a first insert pivotally attached through an arm means to a shaft means carried by said first mold half; a second insert pivotally attached through an arm means to a shaft means carried by said second mold half; a first cam rod fixedly attached to said first mold half, said cam rod extending beyond a forwardmost portion of said first mold half, and being disposed below said first and second mold halves, and having an end portion thereof in the form of a sloping cam surface aligned with said arm carrying said second insert so that upon closing of said mold halves said sloping cam surface of said first cam rod contacts said arm carrying said second insert to thus cause said second insert to pivot upward; a second cam rod fixedly attached to said second mold half, said second cam rod extending beyond a forwardmost portion of said second mold half and being disposed below said first and second mold halves, and having an end thereof in the form of a sloping cam surface aligned with said arm carrying said first insert so that upon closing of said mold halves said sloping cam surface of said second cam rod contacts said arm carrying said first insert to thus cause said first insert to pivot upward; and means to open and close said mold halves.

2. Apparatus according to claim 1 wherein said mold halves are disposed in a vertical plane, said inserts thus pivoting downwardly on opening of said mold halves through the action of gravity.

3. Apparatus according to claim 1 wherein said inserts are so contoured to impart a recess to substantially the entire bottom of an article being molded.

4. Apparatus according to claim 1 wherein at least one of said inserts contains a cutting means.

5. Apparatus according to claim 4 wherein said mold halves constitute a bottle mold.

6. Apparatus according to claim 4 wherein said cutting means is disposed downward from a bottom forming surface of said mold a distance of $\frac{1}{32}$ to $\frac{1}{8}$-inch.

7. Apparatus according to claim 6 wherein said inserts are so contoured as to impart a recess to substantially the entire bottom of an article being molded.

References Cited

UNITED STATES PATENTS

| | | | |
|---|---|---|---|
| 1,598,797 | 9/1926 | Wood | 249—161 X |
| 2,903,740 | 9/1959 | Parfrey | 18—5 BA |
| 3,004,285 | 10/1961 | Hagen | 18—5 BZ X |
| 3,050,773 | 8/1962 | Hagen | 18—5 BZ X |

FOREIGN PATENTS

| | | | |
|---|---|---|---|
| 221,038 | 3/1958 | Australia | 18—5 BS |

J. SPENCER OVERHOLSER, Primary Examiner

M. O. SUTTON, Assistant Examiner

U.S. Cl. X.R.

18—2 RM; 164—404; 249—66